United States Patent
Houlberg

(10) Patent No.: US 6,720,801 B2
(45) Date of Patent: Apr. 13, 2004

(54) RS-232 BUS DATA TAP APPARATUS

(75) Inventor: Christian Lauritz Houlberg, Ventura, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 540 days.

(21) Appl. No.: 09/882,987

(22) Filed: Jun. 18, 2001

(65) Prior Publication Data

US 2002/0194406 A1 Dec. 19, 2002

(51) Int. Cl.⁷ .................. H03K 3/00; H03K 19/0175; G06K 3/00; G06K 13/00; G06K 23/02
(52) U.S. Cl. .................. 327/108; 710/100; 710/305; 710/15; 326/86; 340/3.1
(58) Field of Search ................ 710/15–19, 305, 710/220, 100, 105–107; 327/108; 326/83, 86, 89, 90; 340/3.1, 3.42, 3.43, 3.44, 635, 660, 663; 370/276, 289, 290, 259, 262

(56) References Cited

U.S. PATENT DOCUMENTS

| | | | | |
|---|---|---|---|---|
| 4,628,303 A | * | 12/1986 | Boyle ........................ | 340/661 |
| 5,121,491 A | * | 6/1992 | Sloan et al. ................ | 710/72 |
| 5,128,962 A | * | 7/1992 | Kerslake et al. ........... | 375/220 |
| 5,148,435 A | * | 9/1992 | Ray et al. .................. | 714/716 |
| 5,194,758 A | * | 3/1993 | Ver Meer ................... | 307/112 |
| 5,343,461 A | * | 8/1994 | Barton et al. .............. | 370/249 |
| 5,400,017 A | * | 3/1995 | Yoshisaka et al. ......... | 340/825.59 |
| 5,436,624 A | * | 7/1995 | Pearce et al. .............. | 340/3.9 |
| 5,502,716 A | * | 3/1996 | Rhebergen ................. | 370/284 |
| 5,504,736 A | * | 4/1996 | Cubbison, Jr. ............. | 370/241 |
| 5,809,026 A | * | 9/1998 | Wong et al. ................ | 370/445 |
| 5,859,596 A | * | 1/1999 | McRae ...................... | 340/870.02 |
| 6,000,003 A | * | 12/1999 | Allen et al. ................ | 713/320 |
| 6,105,093 A | * | 8/2000 | Rosner et al. ............. | 710/105 |
| 6,175,556 B1 | * | 1/2001 | Allen et al. ................ | 370/293 |
| 6,385,176 B1 | * | 5/2002 | Iyengar et al. ............. | 370/286 |
| 6,424,627 B1 | * | 7/2002 | S.o slashed.rhaug et al. .... | 370/241 |

* cited by examiner

Primary Examiner—Sumati Lefkowitz
Assistant Examiner—Trisha Vu
(74) Attorney, Agent, or Firm—David S. Kalmbaugh

(57) ABSTRACT

A monitoring apparatus which allows the user to monitor transmit and receive data of half duplex communications taking place over a full duplex RS-232 bus and also monitor full duplex communications on the RS-232 bus. The monitoring apparatus includes six switching transistors which are turned on and off depending on input voltage levels appearing at the transmit and receive lines input to the monitoring apparatus from the RS-232 bus. Turning on and off the switching transistors enables a computer, lap top or other device connected to the monitoring apparatus to receive and process data communications on the RS-232 bus.

17 Claims, 2 Drawing Sheets

RS-232 BUS DATA TAP APPARATUS

BACKGROUND OF THE INVENTION

1. Field of the Invention

The present invention relates generally to apparatus for monitoring a data bus. In particular, the present invention relates to an apparatus which allows a notebook computer or the like to monitor data transmission via an RS-232 bus.

2. Description of the Prior Art

There is currently a need to monitor communications or data transmission between data terminal equipment and data set equipment which takes place over an RS-232 bus. While it is relatively simple to monitor transmit or receive data independently, it is very difficult to monitor both transmit and receive communications simultaneously.

Commercially available monitoring systems generally monitor communications via the RS-232 bus in only one direction, either transmit data or receive data is monitored, but not data transmission in both directions. Generally, RS-232 bus monitoring devices are relatively simple wire taps or tees.

There is, however, a need for a monitoring apparatus which allows the user to simultaneously monitor transmit and receive data of half duplex communications taking place over a full duplex RS-232 bus with a single port RS-232 connection to a personal computer.

SUMMARY OF THE INVENTION

The present invention overcomes some of the difficulties of the past including those mentioned above in that it comprises a relatively simple in design yet highly effective and efficient monitoring apparatus for use in monitoring data communications via the RS-232 bus between data terminal equipment and data set equipment.

The monitoring apparatus of the present invention allows the user to monitor transmit and receive data of half duplex communications taking place over a full duplex RS-232 bus and also monitor full duplex communications on the RS-232 bus. The monitoring apparatus includes six switching transistors which are turned on and off depending on input voltage levels appearing at the transmit and receive lines input to the monitoring apparatus from the RS-232 bus. Turning on and off the switching transistors enables a computer, lap top or other device connected to the monitoring apparatus to receive and process data communications on the RS-232 bus.

DETAILED DESCRIPTION OF THE PREFERRED EMBODIMENT

Figure 1:
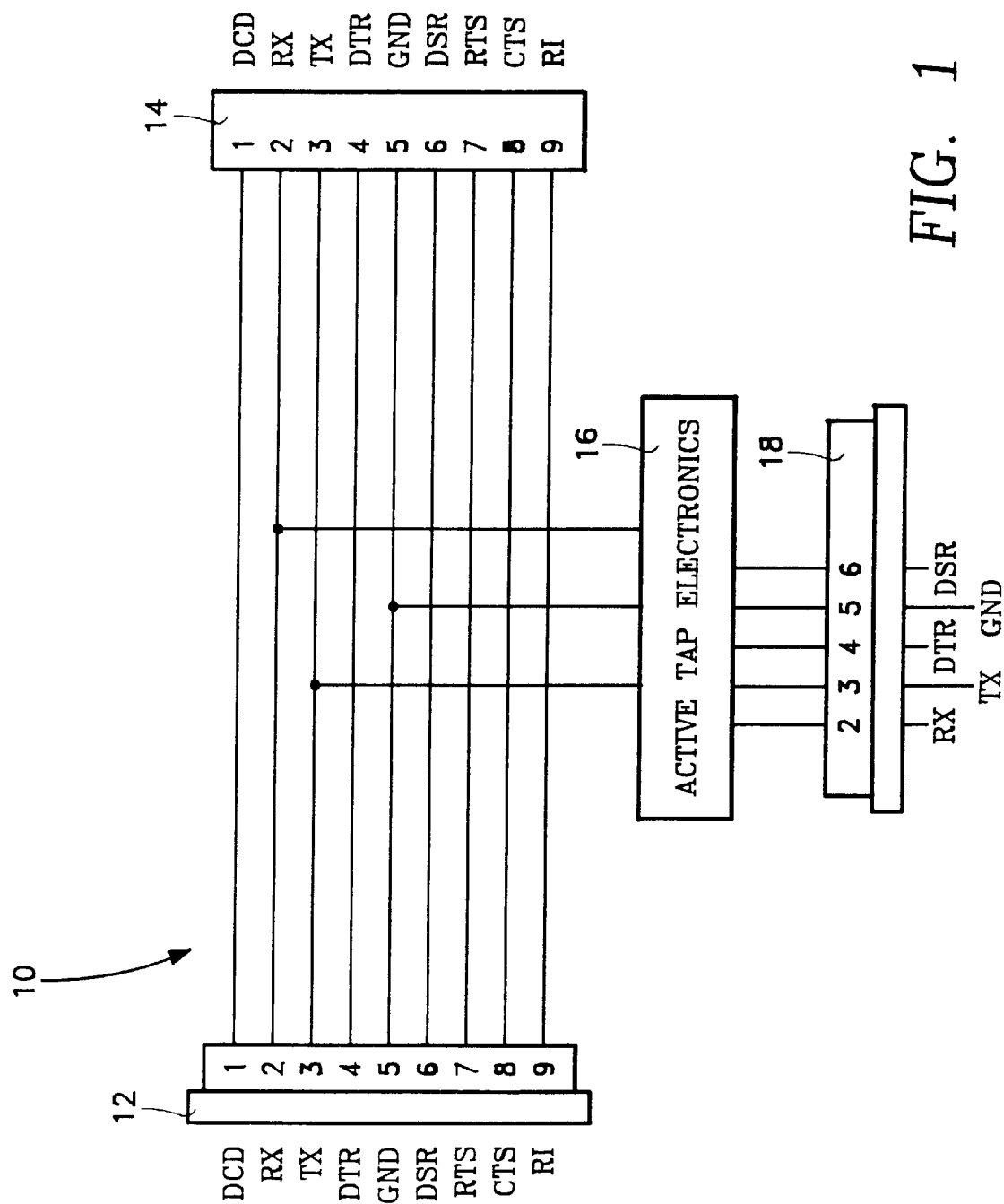
FIG. 1 is a simplified electronics diagram illustrating an RS-232 bus having an active tap electronics device connected thereto.

Referring first to FIG. 1, there is shown a simplified electronics diagram of an RS-232 bus 10 which allows for communications between a data terminal equipment (DTE) via port 12 and data set equipment (DSE) via port 14. Connected to the RX (pin 2), TX (pin 3) and GND (pin 5) lines of RS-232 bus 10 is an active tap electronics circuit 16 which monitors data transmission between the data terminal equipment and the data set equipment. Data terminal equipment is a control system or a computer, while data set equipment may be, for example a modem. The RS-232 bus 10 of FIG. 1 is a full duplex communications system which allows the data terminal equipment to send data to the data set equipment and the data set equipment to send data to the data terminal equipment at the same time. The RS-232 bus 10 can also operate as a half duplex system whereby the data terminal equipment first sends data to the data set equipment, followed by a response from the data set equipment to the data terminal equipment. When bus 10 is operating in the half duplex mode, the active tap electronics circuit 16 monitors transmitted communications to the data set equipment or port 14 and the received communications from the data set equipment to port 12.

RS-232 bus 10 includes a TX line which is a transmit data line, an RX line which is a receive data line, a ground, a Request to Send (RTS), and a Clear to Send (CTS). The DTR line via port 18 supplies positive power to the active tap electronics circuit 16. The TX line of port 18 supplies negative power to the active tap electronics circuit 16. The RX line of port 18 is the monitor input from the active tap electronics circuit 16. The DSR line of port 18 remains open to insure that the TX line of port 18 is the mark state which is a signal of having a voltage range of from −3 VDC to −20 VDC.

At this time it should be noted that only one input to the active tap electronics circuit 16 is allowed to be active, while the other input must be in the mark state, i.e. −3 VDC to −20 VDC. It should also be noted that when monitoring full duplex communications, either the TX or RX input must be disabled, i.e. switched to the marked state to prevent an echo from the sent data from distorting the monitoring of that data.

Ports 12, 14 and 18 are connectors with ports 12 and 18 each being a 9 pin female connector and port 14 being a 9 pin male connector. A notebook, desk top or lap top computer can be connected to port 18 to receive and process the data being monitored by active tap electronics circuit 16. The computer or other device connected to port 18 operates only in a receive mode of operation and does not transmit data. The DTR line of port 18 is at a positive voltage which is the active voltage polarity for the data terminal ready line of a computer or terminal during normal RS-232 bus operation. A software program such as HyperTerminal which is included in Microsoft's Windows 95 can be used to effect the active voltage polarity at the data terminal ready line of port 18.

The transistor Q1, Q2 and Q6 used in the preferred embodiment of the present invention are 2N2222 NPN transistors commercially available from Motorola of Austin, Tex. The transistors Q3, Q4 and Q5 are 2N2907 PNP transistors also commercially available from Motorola. Transistors Q1, Q2, Q3, Q4, Q5 and Q6 are switching transistors which are designed to operate high voltages, i.e. thirty to forty volts. Resistors R1 and R2 are 20 k-ohm resistors, resistors R3 and R4 are 5 k-ohm resistors, resistors R6 and R7 are 200 ohm resistors, resistor R5 is a 2 k-ohm resistor and resistor R8 is a 10 k-ohm resistor. Capacitors C1 and C2 are one microfarad capacitors.

Figure 2:
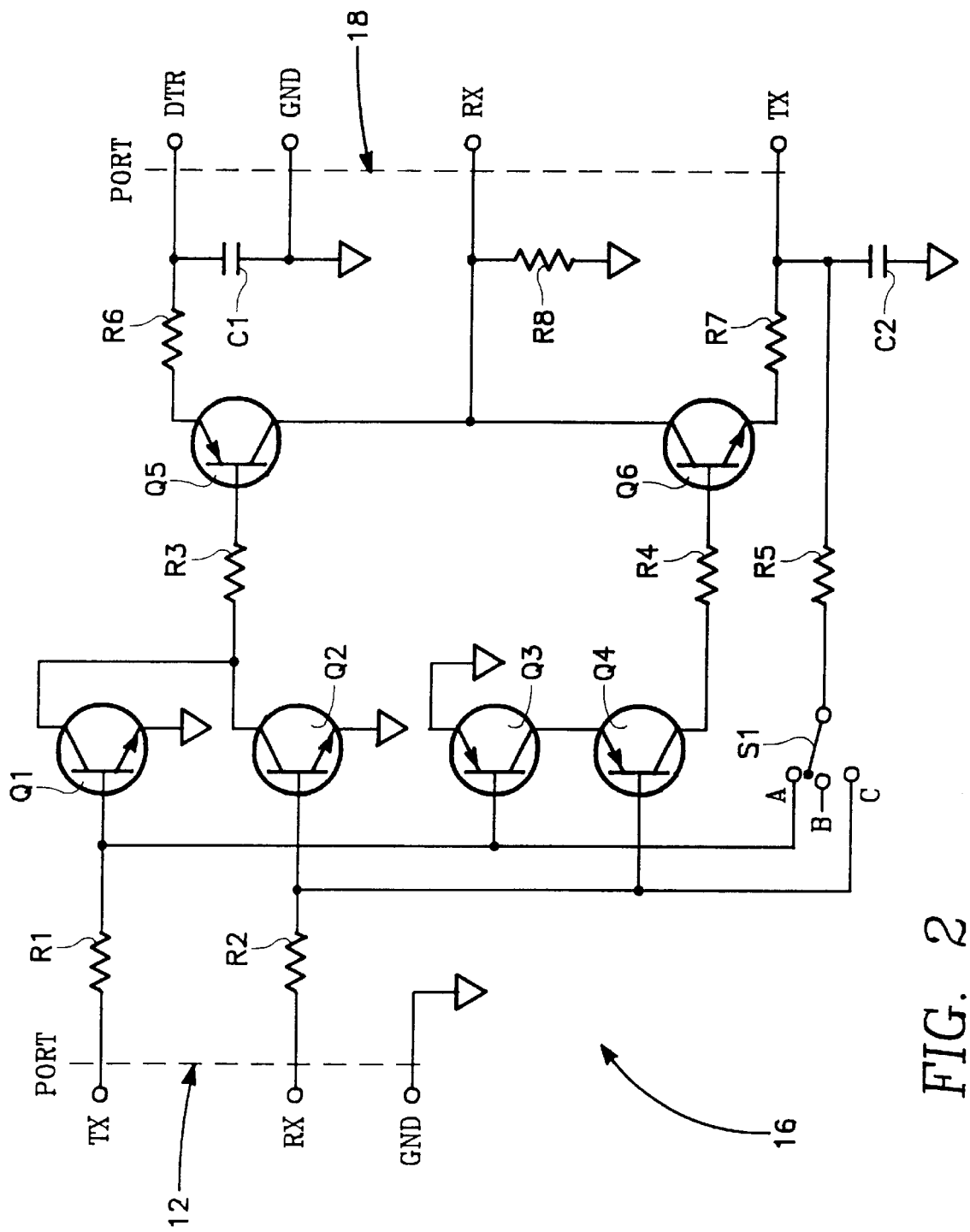
FIG. 2 is a detailed electronics diagram of the active tap electronics device of FIG. 1 which comprises a preferred embodiment.

Referring to FIG. 2, there are three lines, the TX line, the RX line and ground connected to the active tap electronics circuit 16. When RS-232 bus 10 is inactive, that is there is no transfer of data, the TX line is in a mark state and the RX output (port 18) of circuit 16 is also in a mark state.

When either the TX line or the RX line of bus 10 transition to a space state which includes a start bit of +3 VDC to +20 VDC, transistor Q1 or transistor Q2 will turn on. Turning on either transistor Q1 or transistor Q2 turns on transistor Q5. The voltage at the DTR (data terminal ready) line of circuit 16 is transferred through resistor R6 and transistor Q5 to the RX line of port 18 resulting in a high voltage (+3 VDC to +20 VDC) at the RX line of port 18.

A monitoring device, such as a computer supplies high voltage power (+3 VDC to +20 VDC) to the DTR line of circuit 16. The monitoring device is also connected to the RX line of port 18. The voltage drop across R6 is negligible since R6 is a 200 ohm resistor and the input impedance to the RX line of port 18 is a minimum of 3 k-ohms to 7 k-ohms.

When a positive voltage is supplied to the base of transistor Q1, transistor Q1 is turned on. The collector of transistor Q1 is now at ground potential which results in the resistor R3 and the base of transistor Q5 also being at ground potential. This turns on transistor Q5.

When transistor Q5 turns on the current flow path is from the DTR line, port 18 through resistor R6, the emitter base junction of transistor Q5 and resistor R3, and then through the collector emitter junction of transistor Q1 to ground. The positive voltage at the DTR line of port 18 passes through transistor Q5 and appears at the RX line of port 18 of circuit 16.

When the TX line and the RX line of port 12 are a negative voltage, or a mark state, transistors Q1 and Q2 are turned off. A negative voltage supplied to transistors Q3 and Q4, turns on transistors Q3 and Q4. When transistors Q3 and Q4 are turned on a ground potential is applied to resistor R4. The ground potential at resistor R4 turns on transistor Q6. There is a negative voltage at the TX line of port 18 which is then passes through transistor Q6 to the RX line of port 18.

Resistors R3 and R4 are current limiting resistors which prevent large voltages from being applied across the emitter base junctions of transistors Q5 and Q6, thereby preventing damage to transistors Q5 and Q6.

When either the TX line of port 12 or the RX line of port 12 is high, transistor Q1 or transistor Q2 is turned on and transistor Q3 or transistor Q4 is turned off. When either transistor Q3 or transistor Q4 is turned off, there is no current flow through the emitter base junction of transistor Q6 and transistor Q6 is turned off. Since either transistor Q1 or transistor Q2 is turned on, transistor Q5 will be turned on which results in a positive voltage being provided to the RX line of port 18.

At this time it should be noted that only transistor Q5 or transistor Q6 will be turned on, transistors Q5 and Q6 can not be turned on simultaneously without destroying the transistors.

Whenever port 12 is not connected to RS-232 bus 10 the TX and RX lines of port 12 are floating. This results in transistors Q1, Q2, Q3 and Q4 being turned off, which, in turns off transistors Q5 and Q6. The RX output of port 18 is at the ground state since the ground applied to resistor R8 is provided to the RX output of port 18.

Referring to FIGS. 1 and 2, when RS-232 bus 10 is in a full duplex mode of operation, either the TX line or the RX line of port 12 must be disabled. Circuit 16 includes a switch S1 which is set to its A terminal to disable the TX line of port 12 and its C terminal to disable the RX line of port 12. Setting the switch S1 to its A terminal disables transistor Q1 since a negative voltage is applied to transistor Q1 and turns on transistor Q3. In a like manner, setting the switch S1 to its C terminal disables transistor Q2 since a negative voltage is applied to transistor Q2 and turns on transistor Q4. Terminal B of switch S1 is a floating terminal. Resistor R5 is a current limiting resistor which protects transistors Q3 and Q4.

When RS-232 bus 10 is in a full duplex mode of operation, the transmitted commands from port 12, are echoed back by the receive device connected to port 14. This requires the user of active tap electronics circuit 16 to disable the TX line by setting the switch S1 to its A terminal so that only the RX line is being monitored. This allows the user to monitor the echo of the transmitted data and the response to the transmitted data provided by the receive device or data set equipment.

When the only line being utilized to transmit and receive data is the TX line of RS-232 bus 10, the user can disable the RX line at port 12 of circuit 16 by setting the switch S1 to the its C terminal.

From the foregoing, it may readily be seen that the present invention comprises a new, unique and exceedingly useful RS-232 bus data tap apparatus for monitoring data transmission on an RS-232 bus which constitutes a considerable improvement over the known prior art. Obviously, many modifications and variations of the present invention are possible in light of the above teachings. It is, therefore to be understood that within the scope of the appended claims that the invention may be practiced otherwise than as specifically described.

What is claimed is:

1. A data transmission monitoring apparatus for monitoring data transmission on an RS-232 bus having a transmit line and a receive line, said data transmission monitoring apparatus comprising:

a first switching circuit connected to said RS-232 bus to receive data transmitted over the transmit line and the receive line of said RS-232 bus;

a second switching circuit connected to said RS-232 bus to receive the data transmitted over the transmit line and the receive line of said RS-232 bus;

a third switching circuit connected to said first switching circuit and an external computer to receive a positive voltage signal;

a fourth switching circuit connected to said second switching circuit and said external computer to receive a negative voltage;

said first switching circuit turning on said third switching circuit whenever the data transmitted over the transmit line and the receive line of said RS-232 bus has a positive voltage level;

said second switching circuit turning on said fourth switching circuit whenever the data transmitted over the transmit line and the receive line of said RS-232 bus has a negative voltage level;

said third switching circuit passing the positive voltage signal from said external computer through said third switching circuit to a receive input on said external computer whenever said first switching circuit turns on said third switching circuit; and said fourth switching circuit passing the negative voltage signal from said external computer through said fourth switching circuit to the receive input on said external computer whenever said second switching circuit turns on said fourth switching circuit.

2. The data transmission monitoring apparatus of claim 1 further comprising:
   (a) a three position switch having first, second and third terminals, the first terminal of said three position switch being connected to the transmit line of said RS-232 bus, the second terminal of said three position switch being connected to the receive line of said RS-232 bus and the third terminal of said three position switch being a floating terminal; and
   (b) said three position switch being connected to said external computer to supply the negative voltage signal from said external computer to said three position switch to selectively disable the transmit line and the receive line of said RS-232 bus connected to said data transmission monitoring apparatus and prevent said data transmission monitoring apparatus from monitoring data transmission over the transmit line and the receive line of RS-232 bus.

3. The data transmission monitoring apparatus of claim 1 wherein said first switching circuit comprises:
   (a) a first resistor having a first terminal connected to the transmit line of said RS-232 bus and a second terminal;
   (b) a second resistor having a first terminal connected to the transmit line of said RS-232 bus and a second terminal;
   (c) a first switching transistor having an emitter connected to ground, a base connected to the second terminal of said first resistor and a collector;
   (d) a second switching transistor having an emitter connected to ground, a base connected to the second terminal of said second resistor and a collector connected to the collector of said first switching transistor; and
   (e) a third resistor having a first terminal connected to the collector of said first switching transistor and a second terminal connected to said third switching circuit.

4. The data transmission monitoring apparatus of claim 3 wherein said first switching transistor and said second switching transistor each comprise an NPN switching transistor.

5. The data transmission monitoring apparatus of claim 1 wherein said second switching circuit comprises:
   (a) a first switching transistor having an emitter connected to ground, a base connected to said first switching circuit and a collector;
   (b) a second switching transistor having an emitter connected to the collector of said first switching transistor, a base connected to said first switching circuit and a collector; and
   (c) a resistor having a first terminal connected to the collector of said second switching transistor and a second terminal connected to said fourth switching transistor.

6. The data transmission monitoring apparatus of claim 5 wherein said first switching transistor and said second switching transistor each comprise a PNP switching transistor.

7. The data transmission monitoring apparatus of claim 1 wherein said third switching circuit comprises:
   (a) a resistor having a first terminal connected to the data terminal ready line of said external computer and a second terminal; and
   (b) a PNP switching transistor having an emitter connected to the second terminal of said resistor, a base connected to said first switching circuit and a collector connected to the receive line of said external computer.

8. The data transmission monitoring apparatus of claim 1 wherein said fourth switching circuit comprises:
   (j) a first resistor having a first terminal connected to the transmit line of said external computer and a second terminal;
   (k) an NPN switching transistor having an emitter connected to the second terminal of said first resistor, a base connected to said second switching circuit and a collector connected to the receive line of said external computer; and
   (m) a second resistor having a first terminal connected to the receive line of said external computer and a second terminal connected to ground.

9. A data transmission monitoring apparatus for monitoring data transmission on an RS-232 bus having a transmit line and a receive line, said data transmission monitoring apparatus comprising:
   (a) a first resistor having a first terminal connected to the transmit line of said RS-232 bus and a second terminal;
   (b) a second resistor having a first terminal connected to the receive line of said RS-232 bus and a second terminal;
   (c) a first switching transistor having an emitter connected to ground, a base connected to the second terminal of said first resistor and a collector;
   (d) a second switching transistor having an emitter connected to ground, a base connected to the second terminal of said second resistor and a collector connected to the collector of said first switching transistor;
   (e) a third switching transistor having an emitter connected to ground, a base connected to the second terminal of said first resistor and a collector;
   (f) a fourth switching transistor having an emitter connected to the collector of said third switching transistor, a base connected to the second terminal of said second resistor and a collector;
   (g) a third resistor having a first terminal connected to the collector of said first switching transistor and a second terminal;
   (h) a fourth resistor having a first terminal connected to the collector of said fourth switching transistor and a second terminal;
   (i) a fifth resistor having a first terminal connected to a data terminal ready line of an external computer and a second terminal;
   (j) a sixth resistor having a first terminal connected to a transmit line of said external computer and a second terminal;
   (k) a fifth switching transistor having an emitter connected to the second terminal of said fifth resistor, a base connected to the second terminal of said third resistor and a collector connected to a receive line of said external computer;
   (l) a sixth switching transistor having an emitter connected to the second terminal of said sixth resistor, a base connected to the second terminal of said fourth resistor and a collector connected to the receive line of said external computer; and
   (m) a seventh resistor having a first terminal connected to the receive line of said external computer and a second terminal connected to ground.

10. The data transmission monitoring apparatus of claim 9 further comprising:
   (a) a switch having a first terminal connected to the second terminal of said first resistor, a second terminal connected to the second terminal of said second resistor and a third terminal;

(b) an eighth resistor having a first terminal connected to the third terminal of said switch and a second terminal connected to the transmit line of said external computer; and;

(c) a capacitor having a first terminal connected to the transmit line of said external computer and a second terminal connected to ground.

11. The data transmission monitoring apparatus of claim 9 further comprising a capacitor having a first terminal connected to the data terminal ready line of said external computer and a second terminal connected to ground.

12. The data transmission monitoring apparatus of claim 9 wherein said first switching transistor, said second switching transistor, and said sixth switching transistor each comprise an NPN switching transistor; and said third switching transistor, said fourth switching transistor, and said fifth switching transistor each comprise a PNP switching transistor.

13. The data transmission monitoring apparatus of claim 9 wherein said first resistor and said second resistor each comprise a 20 k-ohm resistor; said third resistor and said fourth resistor each comprise a 5 k-ohm resistor; said fifth resistor and said sixth resistor each comprise a 200 ohm resistor; and said seventh resistor comprises a 10 k-ohm resistor.

14. A data transmission monitoring apparatus for monitoring data transmission on an RS-232 bus having a transmit line and a receive line, said data transmission monitoring apparatus comprising:

(a) a first resistor having a first terminal connected to the transmit line of said RS-232 bus and a second terminal;

(b) a second resistor having a first terminal connected to the receive line of said RS-232 bus and a second terminal;

(c) a first switching transistor having an emitter connected to ground, a base connected to the second terminal of said first resistor and a collector;

(d) a second switching transistor having an emitter connected to ground, a base connected to the second terminal of said second resistor and a collector connected to the collector of said first switching transistor;

(e) a third switching transistor having an emitter connected to ground, a base connected to the second terminal of said first resistor and a collector;

(f) a fourth switching transistor having an emitter connected to the collector of said third switching transistor, a base connected to the second terminal of said second resistor and a collector;

(g) a third resistor having a first terminal connected to the collector of said first switching transistor and a second terminal;

(h) a fourth resistor having a first terminal connected to the collector of said fourth switching transistor and a second terminal;

(i) a fifth resistor having a first terminal connected to a data terminal ready line of an external computer and a second terminal;

(j) a sixth resistor having a first terminal connected to a transmit line of said external computer and a second terminal;

(k) a fifth switching transistor having an emitter connected to the second terminal of said fifth resistor, a base connected to the second terminal of said third resistor and a collector connected to a receive line of said external computer;

(l) a sixth switching transistor having an emitter connected to the second terminal of said sixth resistor, a base connected to the second terminal of said fourth resistor and a collector connected to the receive line of said external computer;

(m) a seventh resistor having a first terminal connected to the receive line of said external computer and a second terminal connected to ground;

(n) a switch having a first terminal connected to the second terminal of said first resistor, a second terminal connected to the second terminal of said second resistor and a third terminal;

(o) an eighth resistor having a first terminal connected to the third terminal of said switch and a second terminal connected to the transmit line of said external computer; and;

(p) a first capacitor having a first terminal connected to the transmit line of said external computer and a second terminal connected to ground; and (q) a second capacitor having a first terminal connected to the data terminal ready line of said external computer and a second terminal connected to ground.

15. The data transmission monitoring apparatus of claim 14 wherein said first switching transistor, said second switching transistor, and said sixth switching transistor each comprise an NPN switching transistor; and said third switching transistor, said fourth switching transistor, and said fifth switching transistor each comprise a PNP switching transistor.

16. The data transmission monitoring apparatus of claim 14 wherein said first resistor and said second resistor each comprise a 20 k-ohm resistor; said third resistor and said fourth resistor each comprise a 5 k-ohm resistor; said fifth resistor and said sixth resistor each comprise a 200 ohm resistor; said seventh resistor comprises a 10 k-ohm resistor; and said eighth resistor comprises a 2 k-ohm resistor.

17. The data transmission monitoring apparatus of claim 14 wherein said first capacitor and said second capacitor each comprise a one microfarad capacitor.

* * * * *